US011080959B1

(12) United States Patent
Gonzalez (10) Patent No.: US 11,080,959 B1
(45) Date of Patent: Aug. 3, 2021

(54) SECURE VOTING SYSTEM OVER THE INTERNET

(71) Applicant: Carlos Manuel Gonzalez, Mission, TX (US)

(72) Inventor: Carlos Manuel Gonzalez, Mission, TX (US)

(*) Notice: Subject to any disclaimer, the term of this patent is extended or adjusted under 35 U.S.C. 154(b) by 0 days.

(21) Appl. No.: 16/878,947

(22) Filed: May 20, 2020

(51) Int. Cl.
G07C 13/00 (2006.01)
H04L 29/06 (2006.01)
H04N 21/475 (2011.01)

(52) U.S. Cl.
CPC ............ G07C 13/00 (2013.01); H04L 63/083 (2013.01); H04N 21/4758 (2013.01); *G06Q 2230/00* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| 10,305,898 B1* | 5/2019 | Gonzalez | H04L 9/30 |
|---|---|---|---|
| 2003/0149616 A1* | 8/2003 | Travaille, V | H04H 20/38 705/12 |
| 2003/0172166 A1* | 9/2003 | Judge | G06F 15/16 709/229 |
| 2009/0089155 A1* | 4/2009 | Fein | G06Q 10/10 705/12 |
| 2010/0323729 A1* | 12/2010 | Chitsey | H04L 51/12 455/466 |
| 2013/0055381 A1* | 2/2013 | Hao | G06F 21/32 726/18 |
| 2015/0363785 A1* | 12/2015 | Perez | G06Q 20/206 705/44 |

(Continued)

OTHER PUBLICATIONS

Mahmood Yakubu, "The Use of Biometric Voter Authentication System: Experiences, Issues and Way Forward", Apr. 26, 2017 (Year: 2017).*

*Primary Examiner* — Jacob C. Coppola
*Assistant Examiner* — Timothy Paul Sax (57) ABSTRACT

The present invention is about a Secure Voting System over the internet where a Voting User request to vote over the internet. The request is handled by an Internet Voting Regulator Agency in charge of managing the internet voting by interacting with the Voting User, and using an external independent web server Rhythm Certification Agency to authenticate the voting user, and an Official Voting Agency to officially supervise and record the voting process. The Voting User will be authenticated by means of his/her typing rhythm recorded at computer device of the Voting User, and the analysis of the typing rhythm recorded results with the previous typing rhythm statistics stored at the Rhythm Certification Agency. The Internet Voting Regulator Agency will send the Voting User a text to be typed and record the typing rhythm of such text by the voting User, the results of the typing rhythm will be sent to be analyzed by the external independent web server Rhythm Certification Agency which will authenticate the voting user. Only voting users registered and authenticated at the Rhythm Certification Agency will be permitted to vote over the internet.

1 Claim, 8 Drawing Sheets

(56) References Cited

U.S. PATENT DOCUMENTS

| | | | |
|---|---|---|---|
| 2016/0036589 A1* | 2/2016 | Toyoizumi | G06F 21/33 |
| | | | 713/168 |
| 2017/0085550 A1* | 3/2017 | Durham, III | H04L 63/083 |
| 2019/0095600 A1* | 3/2019 | Chan | G06F 16/24575 |
| 2020/0137118 A1* | 4/2020 | Lyon | H04L 63/1441 |
| 2020/0258338 A1* | 8/2020 | Goswami | H04L 9/3239 |

* cited by examiner

SECURE VOTING SYSTEM OVER THE INTERNET

BACKGROUND OF THE INVENTION

There are many previous art patents granted for electronic voting, using different techniques to guarantee the security of the voting process.

Sion; Radu [01] patent is about an Anti-tamper system, which offers a system for protecting sensitive data, but is basically for a device, and not for any internet voting.

Blachman [02] patent is about a local electronic voting network configured as a daisy chain network. Which is designed for a voting system in a closed local network.

A patent for a method of security and verifiability of an electronic vote is provided by [03] where the method is based on the use encryption with public key encryption which is a static way of guarantee authentication.

Chen [04] invention provides a voting system based on smart mobile communication devices, which uses PKI encryption to provide security. The client module is installed on the smart mobile communication device and it is used for temporarily saving the voter's information, submitting identity verification request, showing voting inquiries, and submitting votes Another approach by Onischuk [05] states that officials using computers research and creating lists of Certified Registered Voters and Proxies whom are sent as computer encoded ballots and return containers. Thus, voting users utilize random symbolic identifiers, which is also a static authentication method.

With a similar approach to static authentication Marchal [06] describes a method of authenticating and counting through a secure electronic voting system and electronic voting system implementing such a method. Where he uses a unique and confidential validation code, making it another static authentication approach.

Vicari [07] patent is for a mobile electronic device used to generate a vote. As security Vicari uses control numbers which is also a static authentication strategy.

A technology and methods for federated voting with criteria-based discrimination as well as real-time voter monitoring of voting scenarios is Yee's [08] patent. It is basically for gathering customer preference information, and for users to rated products or services that they may be interested in. Not for an election voting.

Another example of electronic voting patents is Chung [09] about a voting system and method that provides a printed confirmation of voting selections made. It is basically a method to securely print voting ballots.

One interesting patent is by Chung [10] where Internet voting or other Internet transaction comprises transmitting three information packets via the Internet. At least one information packet includes an identifier that is authenticated, such as a key, a biometric digitized signature or other biometric identifier. Where an information packet may include transaction information in a predetermined form, information packets including information in another form may be processed separately. The main drawback is that the authentication is static, that is, once is given, there is no guarantee that the next authentication comes from the user. The patent presents biometric characteristic, such as a fingerprint, palm print, eye and/or iris scan, facial scan and the like, that reliably identifies an individual, but again, it is required to be done once, and even then, the biometric information be stored beforehand by an intruder. They use only one local database to check for the biometric information which is a single point of security failure.

Another patent from the same inventor Chung [11] deals with a biometric registration and/or verification system and method. The system comprised of: a biometric sensor for capturing biometric data; a data entry device, a computer processor for receiving captured biometric data and entered data; and a database storing records thereof. Has the same problem as the previously discussed patent Chung [10] where the authentication even if is dynamic, it may come from data stored offline and used as needed, in other words, there is no dynamic authentication of the user using the system.

Auerbach [12], [13] inventions concern computer systems that are specially adapted to propagate content over a dynamic network, substantially in real time, by virtue of the locational proximity of network joined client computers. Is for use in Restricted Computer Networks, not over the internet. Even though it mentions rhythm of typing, it is explained how end when to use it. This patent is basically a computer system for disseminating content among interconnected client computers, not designed for election voting An invention that relates generally to a system and methods that facilitates the identification of an individual through the use of data was granted to Mil'shtein [14]. Uses a device to obtain physiological characteristics. Mentions rhythm but not how to capture it or use it. Voting only physical not over internet Ford [15] describes a method and system for a secure exchange. It mentions rhythm, but it does not mention the use of it. It is used only for amendment voting, where an amendment voting facility may provide for managing, integrating, and facilitating a process where agency clients executing a transaction (e.g. a syndicated loan) may vote on modifications or amendments to a transaction or transaction content, including an auditable process, aggregated vote metrics, centralized vote processing, and the like.

In their patent Mannan [16] they mention rhythm in the specifications but again not how and when to use it. Rhythm is not used in their claims. The use only password and encryption in their claims. They only mention voting as reference, not used in their system.

There are many technical articles related to electronic voting [17]-[24] for employing electronic voting systems in regular elections. Some of these articles deal with problems such as coercion and vote selling that have to be solved, that is why coercion resistance has been an important issue in electronic voting.

There is an important method that has recently gained much popularity is the Helios voting system [25]-[33]. The Helios Voting technology is based on advanced peer-reviewed cryptographic techniques that enable your vote to remain secret while providing an intelligent ballot tracker to let you verify that your ballot was received and counted properly.

All the previous art including patents and technical articles none addresses the use of typing rhythm as a dynamic technology to achieve authentication of the user. With the present invention the voting user has to authenticated at each interaction with the voting authority. Since the text to be typed (recording its typing rhythm) by the voting user changes every time, it is not possible for an intruder to falsify these data. In most other biometric measurements, it is possible for an intruder to falsify the data since this data is static. Also, most biometric measurements require a specific equipment that is not easily available (fingerprints may be an exception, but still is a service not available for all computer devices), and expensive to have. The typing rhythm on the other hand does not need a special or expensive device to provide its service.

There are some previous art that talk about rhythm, but only as information, they do not explain how and when to use this typing rhythm. None mentions the use of an external independent rhythm verification agency which guarantees the security and independence of this process. This external independent rhythm verification agency will have a module for network security to offer additional protection to the web server. Some of the techniques used by this module are: Computer access control, Application security, Antivirus software, Secure coding, Secure operating systems, Authentication, Multi-factor authentication, Authorization, Data-centric security, Encryption, Firewall, Intrusion detection system, and Denial of service protection With this patent we use a standalone protected rhythm software application to manage the proper collection and transmission of the voting user typing rhythm. Since this software is a standalone software application, which means that the protection for the proper and legal use of this software is done inside the software itself. Therefore, the standalone software application contains procedures to identify, asses and respond to threats to its integrity.

Finally, as an option to increase the security of the voting process, we propose an embodiment of the invention which will be used only when the standalone protected rhythm software application is designed and implemented to have some of its procedures and algorithms executed remotely by the external independent rhythm certification agency protected server. This external independent rhythm certification agency will have the procedures, algorithms and data needed to execute them remotely, and send the results back for the standalone protected rhythm software application to continue the execution of its program in the computer device of the voting user.

REFERENCES

[01] Sion; Radu, "Anti-tamper system." U.S. Pat. No. 10,572,696 of Feb. 25, 2020.
[02] Blachman; Steven J., Canter; James M., and Gomez; Carlos A, "System and method for electronic voting network." U.S. Pat. No. 10,467,837 of Nov. 5, 2019
[03] Jamin; Regis, and Dahl; Christopher, "Method of security and verifiability of an electronic vote", U.S. Pat. No. 10,341,314 of Jul. 2, 2019
[04] Chen; Lihao, "Voting systems and voting methods based on smart mobile communication devices", U.S. Pat. No. 9,652,920 of May 16, 2017.
[05] Onischuk; Daniel W., "Computerized Voting System", US Patent Application 20130085815, of Apr. 14, 2013
[06] Marchal; Nicolas, "Electronic Vote Producing An Authenticatable Result", US Patent Application 20110238463, of Sep. 29, 2011
[07] Vicari; Joseph, "Computer methods and computer systems for voting", U.S. Pat. No. 8,892,456 of Nov. 18, 2014.
[08] Yee; Dawson, Forbes; Scott C, Guday; Shai, and Abel; Miller Thomas, "Federated voting with criteria-based discrimination", U.S. Pat. No. 8,887,987 of Nov. 18, 2014.
[09] Chung; Kevin Kwong-Tai, "Electronic voting apparatus, system and method", U.S. Pat. No. 7,461,787 of Dec. 9, 2008.
[10] Chung; Kevin Kwong-Tai, Minadeo; James Arthur, and Shi; Xiaoming, "Packet-based internet voting transactions with biometric authentication", U.S. Pat. No. 6,973,581 of Dec. 6, 2005.
[11] Chung; Kevin Kwong-Tai, "Biometric registration and/or verification system and method", U.S. Pat. No. 9,830,674 of Nov. 28, 2017.
[12] Auerbach; Michael H., "Dynamic computer systems and uses thereof", U.S. Pat. No. 9,742,853 of Aug. 22, 2017.
[13] Auerbach; Michael H., "Dynamic computer systems and uses thereof", U.S. Pat. No. 10,305,748 of May 28, 2019.
[14] Mil'shtein; Samson, Durkee; Zachary, Leger; Christopher, Buzawa; Carl, Gribov; Alex, and Dahany; Anas, "System and methods for contactless biometrics-based identification", U.S. Pat. No. 9,773,151 of Sep. 26, 2017.
[15] Ford; Christopher Todd, Choudhary; Mayank, McCarthy; Kevin L., Miharia; Anupam, Giudice; John William, Tadakamalla; Kiran Kumar, Mercer; Cole Parker, Wenzel; Peter, Teamen; Paul, Cazalot; Clement, Darji; Salil J., and Gorin; Jonathan., "Systems and methods of secure data exchange", U.S. Pat. No. 10,033,702 of Jul. 24, 2018.
[16] Mannan; Mohammad, and Zhao; Lianying, "Password triggered trusted encryption key deletion", U.S. Pat. No. 10,516,533 of Dec. 24, 2019.
[17] Kwon, Soonhak; Yun, Aaram (2016 Mar. 9). Information Security and Cryptology—ICISC 2015: 18th International Conference, Seoul, South Korea, Nov. 25-27, 2015, Revised Selected Papers. Springer. pp. 195, 199. ISBN 9783319308401.
[18] Hao, Feng; Ryan, Peter Y. A. (2016 Nov. 30). Real-World Electronic Voting: Design, Analysis and Deployment. CRC Press. p. 355. ISBN 9781498714716.
[19] Greenberg, Andy. "For the Next Election, Don't Recount the Vote. Encrypt It". WIRED. Retrieved 2019 Apr. 25.
[20] R. Araujo, S. Foulle, and J. Traore. A practical and secure coercion-resistant scheme for remote elections. In Frontiers of Electronic Voting, 2007.
[21] M. R. Clarkson, S. Chong, and A. C. Myers. Civitas: Toward a secure voting system. In IEEE Symposium on Security and Privacy, pages 354-368, 2008.
[22] A. Juels, D. Catalano, and M. Jacobsson. Coercion-resistant electronic elections. In ACM WPES, 2005.
[23] W. D. Smith. New cryptographic election protocol with best-known theoretical properties. In Frontiers in Electronic Elections, 2005
[24] S. G. Weber, R. Araujo and J. Buchmann, "On Coercion-Resistant Electronic Elections with Linear Work," The Second International Conference on Availability, Reliability and Security (ARES'07), Vienna, 2007, pp. 908-916.
[25] Backes, Michael; Hammer, Christian; Pfaff, David; Skoruppa, Malte. "Implementation-level analysis of the JavaScript helios voting client". Retrieved 2019 Mar. 15.
[26] Adida, Ben. "Helios: Web-based Open-Audit Voting" (PDF). Retrieved 2019 Mar. 15.
[27] Thomson, Iain (Jun. 16, 2017). "Worried about election hacking? There's a technology fix—Helios". The Register. Retrieved 2019 Apr. 25.
[28] Karayumak; Faith; Kauer, Michaela; Olembo, Maina M.; Volk, Tobias; Volkamer, Melanie (2011). "User study of the improved Helios voting system interfaces". 2011 1st Workshop on Socio-Technical Aspects in Security and Trust (STAST). pp. 37-44. doi:10.1109/STAST.2011.6059254. ISBN 978-1-4577-1183-1.

[29] Cortier, Veronique; Smyth, Ben. "Attacking and fixing Helios: An analysis of ballot secrecy". Retrieved 2019 Mar. 15.
[30] Adida, Ben; Marneffe, Olivier de; Pereira, Olivier; Quisquater, Jean-Jacques. "Electing a University President using Open-Audit Voting: Analysis of real-world use of Helios" (PDF). Retrieved 2019 Mar. -15.
[31] Smyth, Ben. "Ballot secrecy: Security definition, sufficient conditions, and analysis of Helios". Retrieved 2019 Nov. 6.
[32] Adida, Ben. "Helios Documentation: Attacks and Defenses". Accessed 2019 Nov. 06. [Online]. Available https://documentation.heliosvoting.org/attacks-and-defenses
[33] Dan Morell, "Secret Ballots, Verifiable Votes", Accessed: Mar. 5, 2019. [Online]. Available https://harvardmagazine.com/2010/05/secret-ballots-verifiable-votes

BRIEF DESCRIPTION OF THE DRAWINGS

Other objects and advantages of the invention will become more apparent from the specification taken in conjunction with the accompanying drawings, in which.

DETAILED DESCRIPTION OF THE INVENTION

Figure 1:
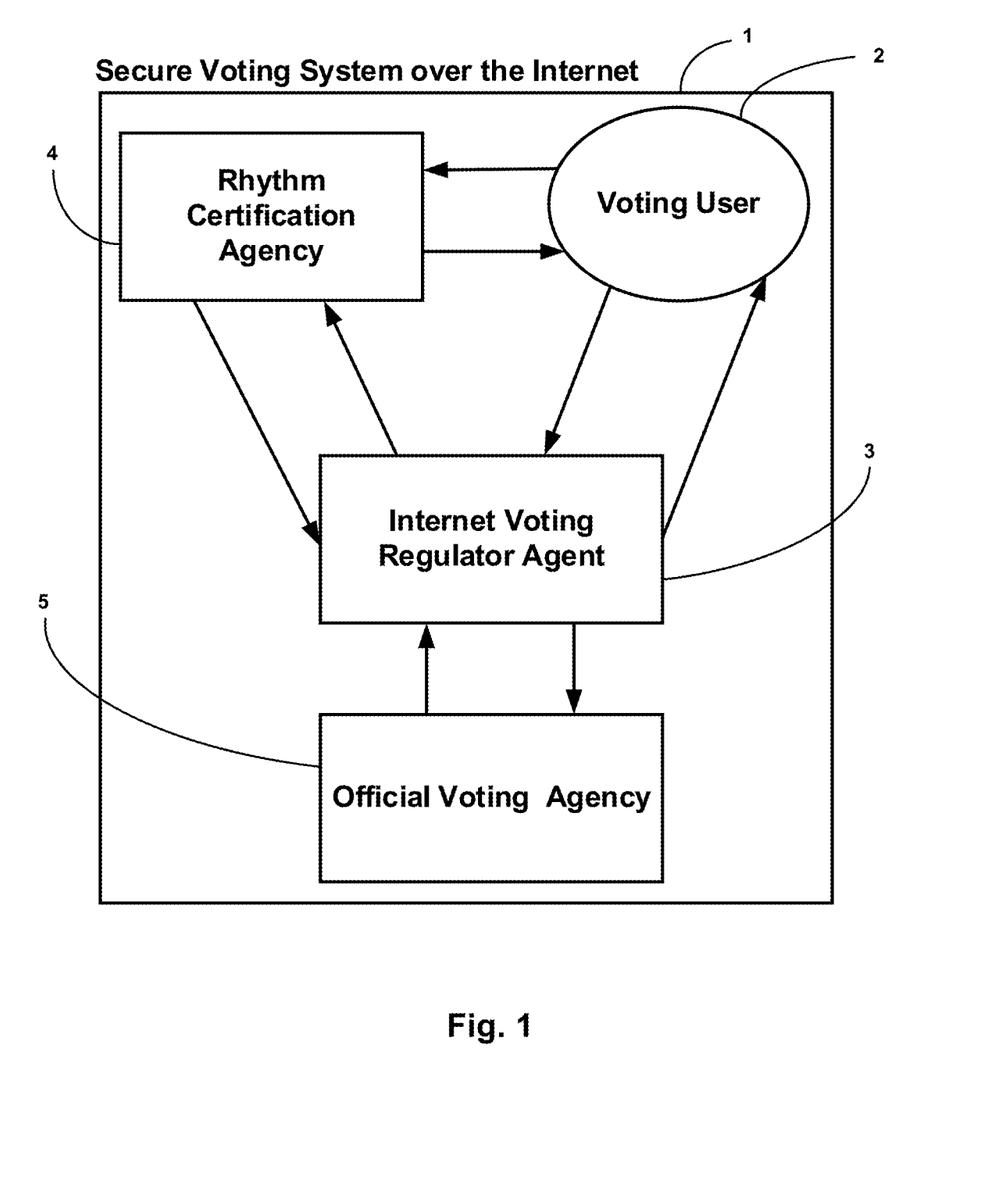
FIG. 1 is a high level system diagram illustrating the logical components of a Secure Voting System over the Internet.
Figure 8:
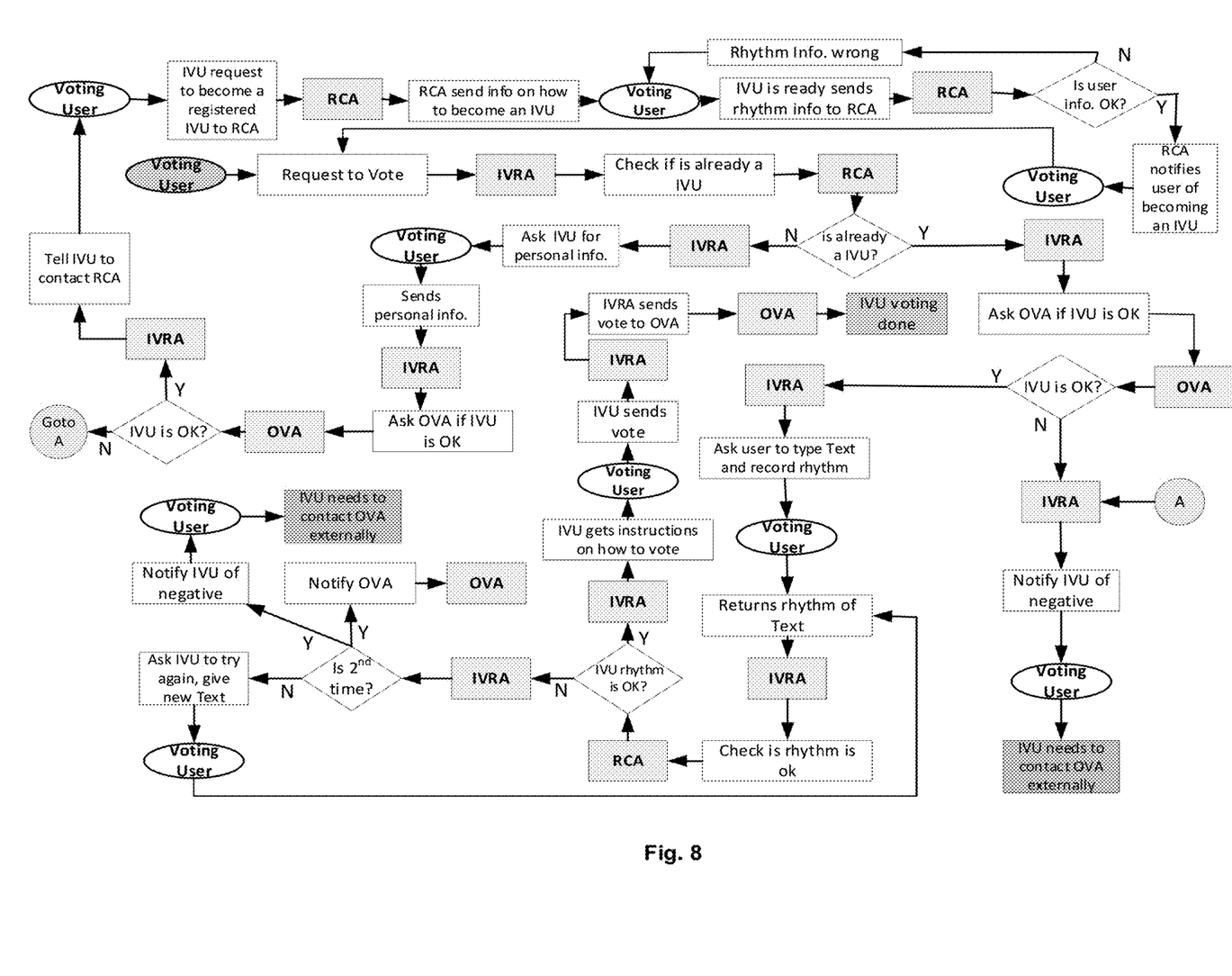
FIG. 8 is detail flow diagram of the processes performed by the system for users to vote over the internet.

FIG. 1 shows the Secure Voting System over the Internet 1. FIG. 8 shows a detail description of the voting processes followed by the Secure Voting System over the Internet. The Secure Voting System over the Internet is comprised of: a Voting User (VU) 2, an Internet Voting Regulator Agent (IVRA) 3, a Rhythm Certification Agency (RCA) 4, and an Official Voting Agency (OVA) 5. A Voting User 2 who wants to vote over the Internet, sends a request to the IVRA 3. After receiving the request from VU 2, The IVRA send a request to RCA 4 to check if VU 2 is already a registered Internet Voting User (IVU). RCA 4 responds with a yes or a no to IVRA 3. If VU 2 is a registered IVU, IRVA 3 will contact the OVA 5 to check if the IVU status is ok. The OVA 5 checks its data base to verify the VU 2 information and current status (check for example that the VU 2 is alive, check if is in jail, address, etc.). If everything is ok OVA 5 sends a note to the IVRA to proceed with the internet voting for this VU 2 now called IVU. If there is something wrong with VU 2, OVA 5 notifies IVRA 3 which notifies VU 2 of the negative from OVA 5, and suggests VU 2 to contact OVA 5 externally.

If the response from OVA 5 is positive, then the IVRA 3 proceeds with the internet voting for this IVU. IVRA 3 request from the user the rhythm of a text that is sent to VU 2. VU 2 captures the rhythm of the sent text and sends it back to IVRA 3. With the rhythm information from VU 2, IVRA 3 contacts RCA 4 to check if the rhythm is ok. If it is not ok, IVRA 3 will notify VU 2 to try again, but for only one more time. If it is not ok twice, VU 2 will be notified of the negative and suggested to contact OVA 5 externally. On the other hand if the rhythm was ok from RCA 4, the IVRA 3 will send VU 2 the instructions on how to vote.

Once VU 2 gets the ok to vote, it will proceed to do that, and send the results back to IVRA 3. The IVRA 3 sends the voting of VU 2 to OVA 5 to make it official. Once OVA 5 gets the results from IVRA 3, records the information and the voting for VU 2 is considered done.

If when VU 2 requests to vote, and IVRA 3 notes that VU 2 is not an IVU, then requests from VU 2 the following personal information, and any other information needed by the OVA 5:
1. Complete legal Name
2. Address where user is registered to Vote
3. SSN
4. Age
5. Other VU 2 sends to IVRA 3 the requested information, and IVRA 3 will contact the OVA 5 to check if the VU 2 status is ok. The OVA 5 checks its data base to verify the VU 2 information and current status (check for example that the VU 2 is alive, check if he/she is in jail, address, etc.). If everything is ok OVA 5 sends a note to the IVRA 3 to proceed with the registering of VU 2 as an IVU. The IVRA 3 contacts VU 2 and sends instructions for the VU 2 to contact RCA 4 to become an IVU. VU 2 sends a request to RCA 4 to become an IVU. RCA 4 responds with instructions for VU 2 on what to do to become an IVU.

The instructions of RCA 4 to VU 2 have basically two parts. First VU 2 should install in VU 2 computer (see FIG. 2 number 7) an application software (see FIG. 2 number 9) to capture VU's 2 typing rhythm. And second, once the application software 9 determines that it has reached a steady state capturing VU 2 typing rhythm, VU 2 should send the captured information back to RCA 4.

Figure 2:
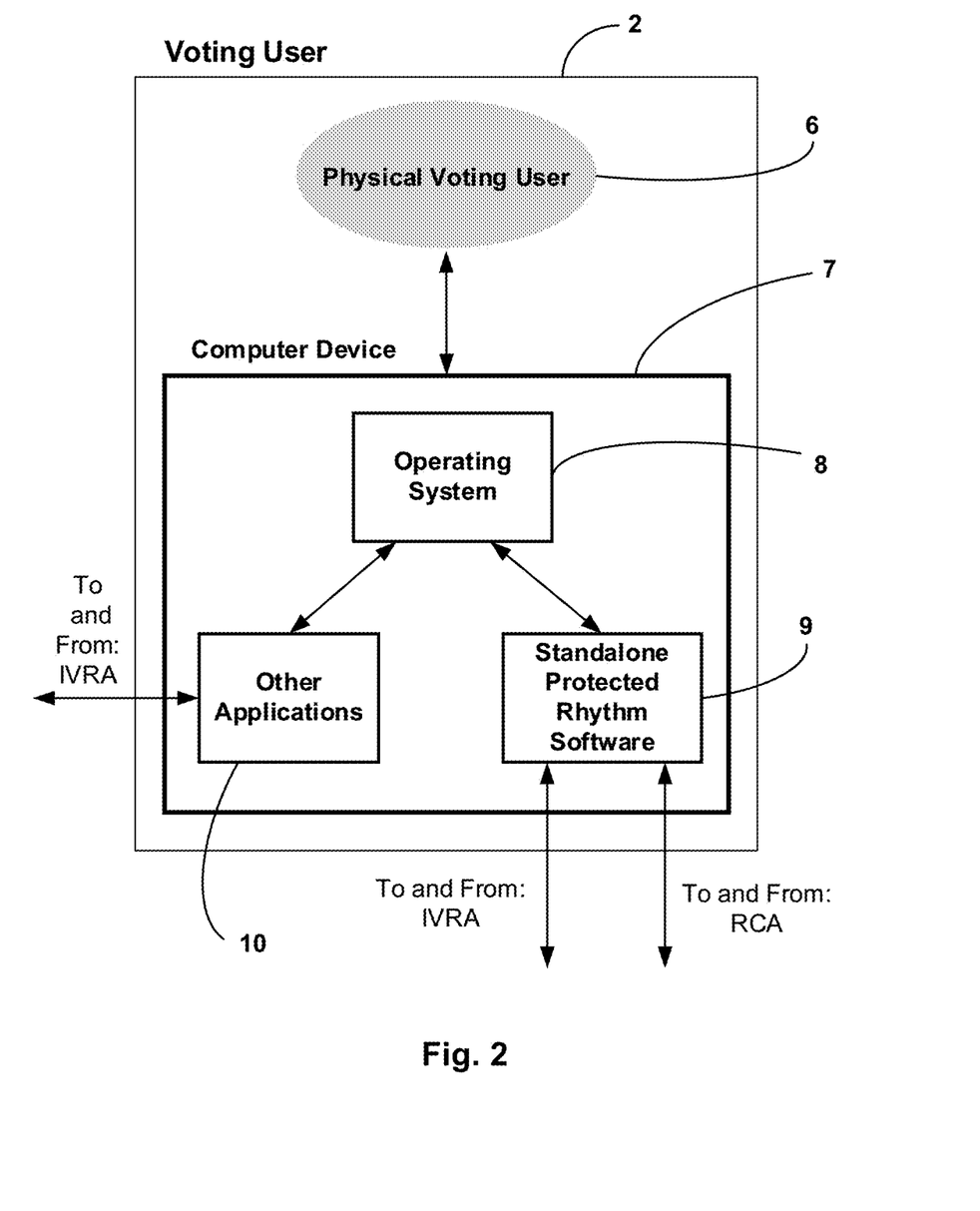
FIG. 2. is a high level system diagram of the basic functional decomposition of the Voting User FIG. 3. is a high level system diagram of the basic functional decomposition of the Internet Voting Regulator Agent FIG. 4. is a high level system diagram of the basic functional decomposition of the Rhythm Certification Agency FIG. 5. is a high level system diagram of the basic functional decomposition of the Standalone Protected Rhythm Software.

RCA 4 will validate the information sent by VU 2, and notify VU 2 if is ok or not. If The information was not ok, RCA 4 notify VU 2 of the error, and suggests what to do to correct the error. If the information was ok, then RCA 4 notify VU 2 that VU2 is officially an IVU.

Once VU 2 receives the official notification from RCA 4 that he/she is an IVU, then VU 2 can proceed to do the voting over the internet any time.

FIG. 2 is a system chart representing the composition of the Voting User 2. For the purpose of usage of this system the Voting User 2 is composed of a Physical Voting User 6 using a personal Computer Device 7. This Computer Device 7 is running an Operating System 8, and a variety of applications. These variety of applications are composed of a Standalone Protected Rhythm Software 9, and the rest of Other Applications 10. The Standalone Protected Rhythm Software 9 runs locally on the user computer and will collect, analyze and store the rhythm measurements of user typing in the user's computer.

The Standalone Protected Rhythm Software 9 communicates with RCA 4 indifferent instances, one is when the Voting User 2 wants to become a registered user of the RCA 4, and RCA 4 responds asking for information about the Voting User 2, which him/her sends back to RCA 4, and RCA 4 checks if Voting User 2 info is ok. If the info is not ok, Voting User 2 must try again and send back to RCA 4 the right info needed.

Another instance of communication with the RCA 4, is when the Standalone Protected Rhythm Software 9 reaches a steady-state for the capturing of the Voting User 2 typing rhythm, and sends RCA 4 all the data (statistical measurements) of the captured typing rhythm. RCA 4 checks the information sent by Standalone Protected Rhythm Software 9, and answers back if this information is ok or not. If the information is not ok, Standalone Protected Rhythm Software 9 must try again to send the right information, because until RCA 4 gives an ok, Voting User 2 is not considered a registered user of RCA 4.

The Standalone Protected Rhythm Software 9 also communicates with IVRA 3. Basically IVRA 3 sends Voting User 2 a text for the user to type and record the user typing rhythm. Once the user performs this typing, Standalone Protected Rhythm Software 9 sends IVRA 3 the typing rhythm information for IVRA 3 to check the identity of Voting User 2. IVRA 3 checks Voting User 2 sent typing rhythm information with RCA 4. RCA 4 sends back to IVRA 3 an answer for the authentication of VU 2, and IVRA 3 will notify VU 2.

Figure 3:
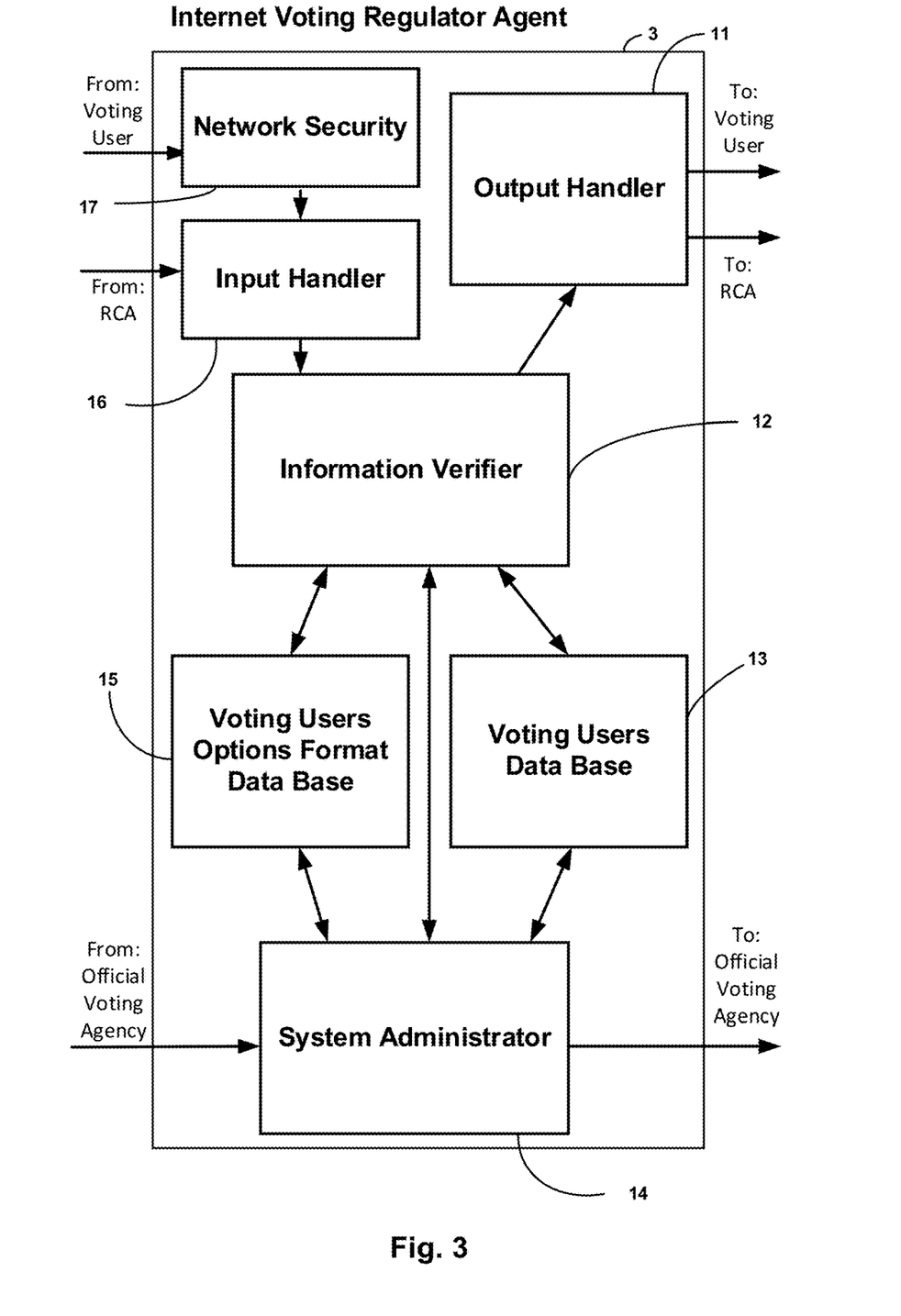

Internet Voting Regulator Agency (IVRA) module 3 functional decomposition is shown in FIG. 3. The IVRA is comprised of seven modules: an Output Handler module 11, an Information Verifier module 12, a Voting Users Data Base module 13, a System Administrator module 14, a Voting Users Options Format Data Base module 15, an Input Handler module 16, and a Network Security module 17.

A VU 2 request to be allowed to vote arrives at Network Security module 17 where the information is analyzed for threats, if none are found the Input Handler module 16 is called to categorize the kind of information that is arriving. Then Information Verifier module 12 is called to verify if VU 2 is a register voter, done by inquiring Voting Users Data Base module 13, where IVRA has all the currently registered voters for this instance of voting process (i.e. local voting, regional, state, etc.). Information Verifier module 12 also verifies if the voting format for this user is ready and available by checking in the Voting Users Options Format Data Base module 15.

Another interaction of IVRA 3 with VU 2 is when IVRA 3 needs to verify the identity of VU 2 by sending VU 2 (via Output Handler module 11) a text to be typed by the user and record the typing rhythm of such text. When VU 2 sends the result of the typing rhythm for the requested text, this information goes into the Network Security module 17 where the information is analyzed for threats. The Information Verifier module 12 is called via Input Handler module 16 to authenticate VU 2 identity. Information Verifier module 12 sends the rhythm information to RCA 4 (via Output Handler module 11) to verify VU 2 identity. RCA 4 responds to IVRA 3 request directly to Input handler module 16. Notice that this input does not go to the Network Security module 17, and is because we assume that RCA 4 is a trustworthy site, not requiring to be analyzed. In case that there is any doubt about the info sent by RCA 4 is not to be always trusted, then we recommend to send RCA 4 inputs to Network Security module 17 for analysis of network threats.

If the Information Verifier module 12 detects any errors, discrepancies, misalignments, missing information, or any other type of anomaly, it will contact immediately the Official Voting Agency 5, via the System Administrator module 14.

Both data bases modules: Voting Users Data Base module 13, and Voting Users Options Format Data Base module 15 receive and send updates to their respective data bases from the Official Voting Agency 5, via the System Administrator module 14.

All input coming to IVRA 3 form VU 2, goes first into the Network Security module 17 to check if the information coming from the network is ok. The Network will be protected from threats like: Malware, Spyware, Trojans, Viruses, Worms, Rootkits, Exploits, Backdoors, Logic bombs, Payloads, Denial of service, Web shells, and Phishing among others.

Figure 4:
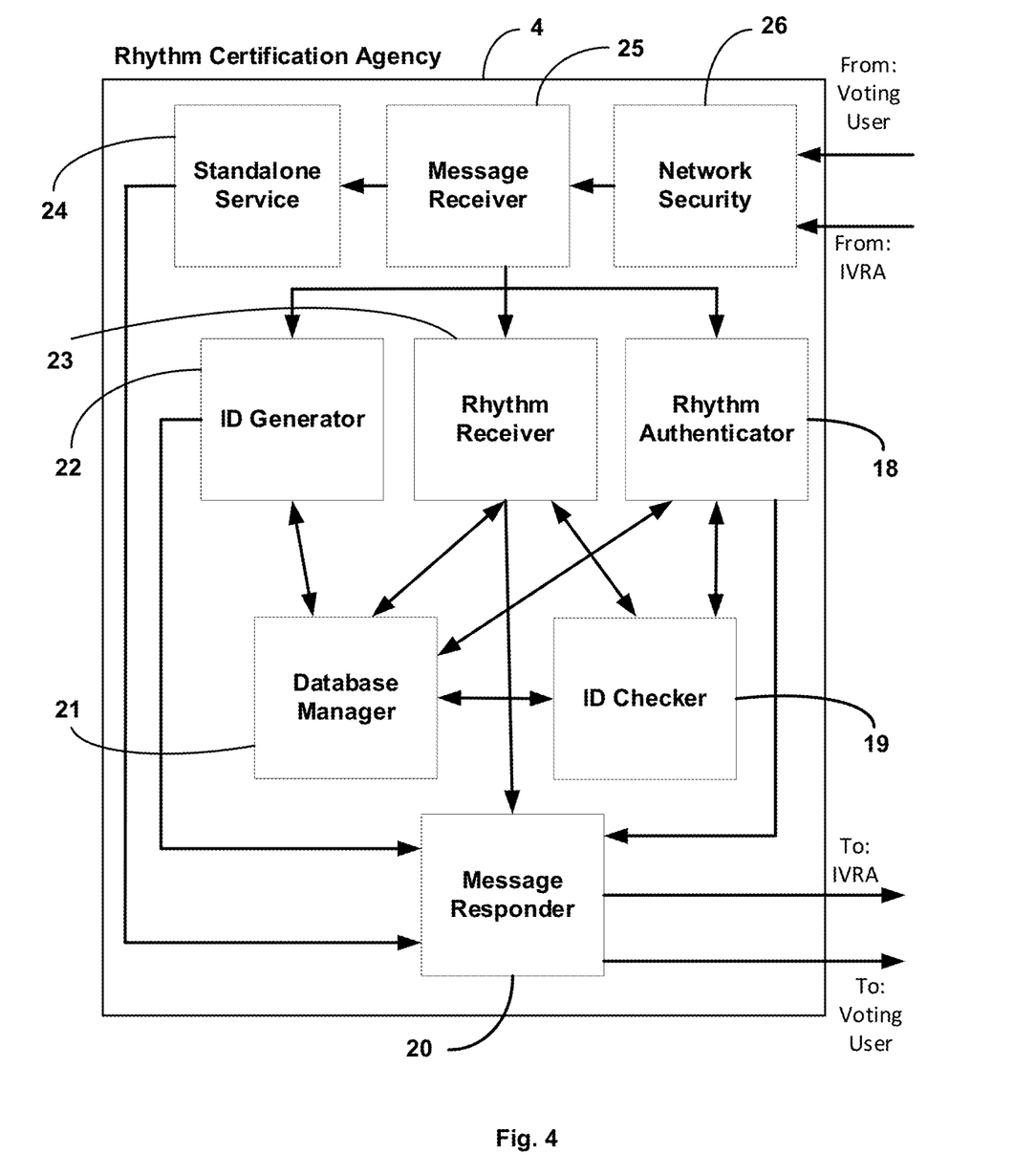

The RCA 4 in FIG. 4 is a web server comprising: a Message Receiver 25, a Network Security 26, an ID Generator 22, an ID Checker 19 a Rhythm Receiver 23, a Rhythm Authenticator 18, a Database Manager 21, a Standalone Service 24, and a Message Responder 20.

When Voting User 2 wants to communicate with the RCA 4, sends an inquiry, received by the Network Security module 26 which analyzes and detects any threats to the security of the RCA 4, once the threats are detected and resolved, the user inquiry is passed to the Message Receiver 25, which analyzes the inquiry, and calls the proper RCA 4 module. If the message is for the creation of a new entry (i.e. a new user, or same user using a different device) in the database, the ID Generator 22 is called. This ID Generator 22 request to the Database Manager 21 the next ID to assign the new user. The Database Manager 21 sends the next available ID in the system to the ID Generator 22, and updates this information in its database. The ID Generator 22 sends the assigned ID to the Message Responder 20, which generates a message (containing the ID assigned to this user) with the answer back to Voting User 2

When the Voting User 2 inquiry received by the Message Receiver 25 is to verify the rhythm of a user, then the Rhythm Authenticator 18 is called. This module will check if the requested rhythm information is available. This is done by checking the Database Manger 21 via the ID Checker 19. If the information is available, the Database Manager 21 returns to the Rhythm Authenticator 18 the locally stored rhythm for the required ID. The Rhythm Authenticator 18 then proceeds to analyze by comparing if all the values of the sent rhythm information are between the minimum and maximum values stored local. The minimum and maximum values are those obtained after reaching the steady-state by the Standalone Protected Rhythm Software 9. Generates a response for the user via the Message Responder 20.

Another instance of Voting User 2 interacting with RCA 4 is when Voting User 2 sends the rhythm information collected by Standalone Protected Rhythm Software 9 for RCA 4 to verify and store in RCA 4 data base. The information will flow from Message Receiver 25 to Rhythm Receiver 23. If the rhythm information is correct, and the Voting User 2 ID checked by ID Checker 19 is also correct, then the Voting User 2 rhythm data is stored in the data base by the Database Manager 21.

When the one making the request is IVRA 3, same as the Voting User 2 the request is first analyzed by the Network Security 26 and then passed to the Message Receiver 15. There are two types of requests by the IVRA 3: a request to check if Voting User 2 is a validated user of the RCA (i.e. the user already has an ID, and his/her rhythm data was validated and saved by the Database Manager 21), and second to send a typing text and captured rhythm of such text by Voting User 2, and request for the authentication of the rhythm for this user. The answers to these requests will be done through the Message Responder module 20.

The Module Network Security 26 will have and use different techniques for the security of the RCA 4 web server. Some of the protection techniques used by this module are: Computer access control, Application security, Antivirus software, Secure coding, Secure operating systems, Authentication, Multi-factor authentication, Authorization, Data-centric security, Encryption, Firewall, Intrusion detection system, and Denial of service protection.

The Standalone Service module 24 will be used only if the Standalone Protected Rhythm Software 9 was designed and implemented to have some of its procedures and algorithms executed remotely by the RCA 4 server. This Standalone Service module 24 will have the procedures, algorithms and data needed to execute them remotely, and send the results back for the Standalone Protected Rhythm Software 9 to continue the execution of its program in the Computer Device 7 of Voting User 2.

Figure 5:
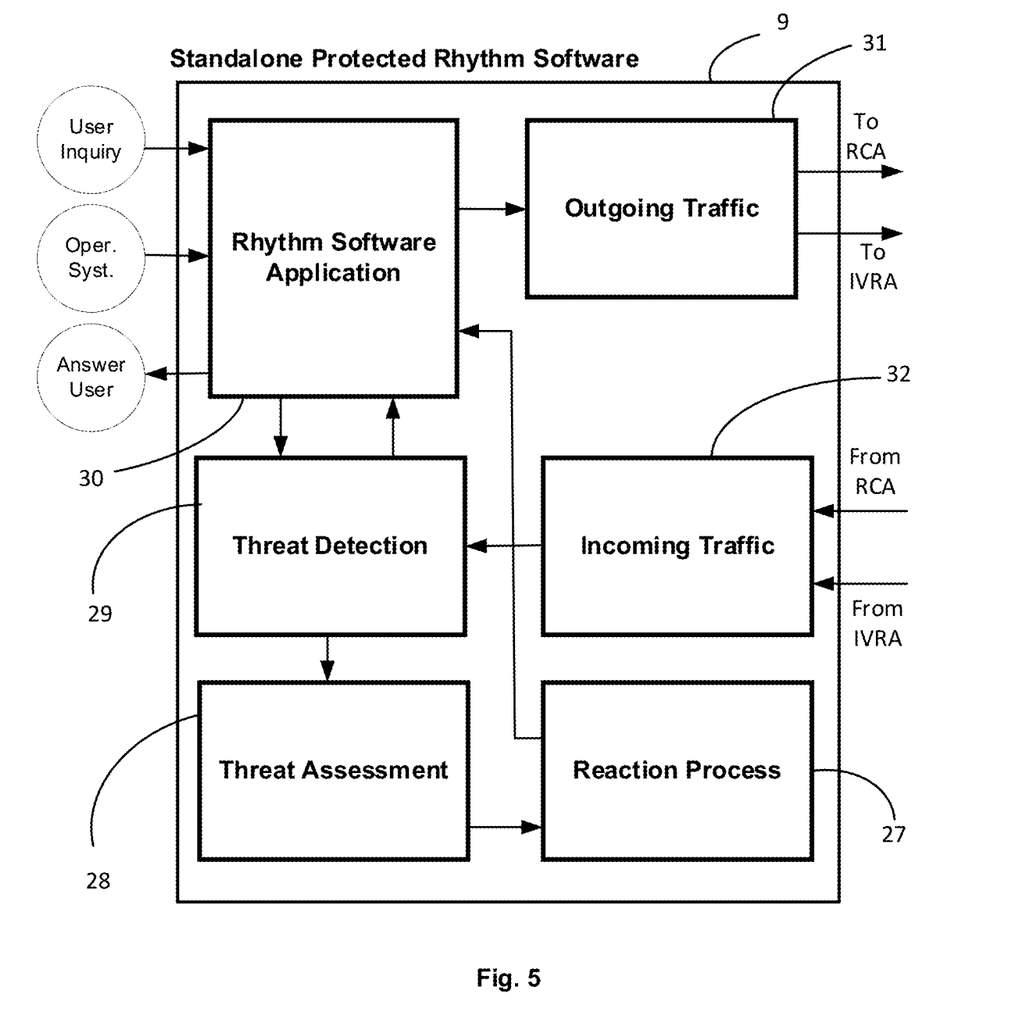

FIG. 5 Shows the software decomposition of the Standalone Protected Rhythm Software 9 which is comprised of: an Outgoing Traffic Module 31, an Incoming Traffic Module 32, a Reaction Process Module 27, a Threat Assessment Module 28, a Threat Detection Module 29, and a Rhythm Software Application Module 30.

Rhythm Software Application Module 30 is in charge of collecting directly from the user through the Computer Device 7 Operating System 8 his/her typing rhythm. This Rhythm Software Application Module 30 also receives instructions from the user requesting for example to start collecting rhythm data for the user typing a specific text, or to send the collected rhythm data to the IVRA 3. In both cases the Rhythm Software Application Module 30 sends back an answer to the user indicating what was the result of his/her command.

The Incoming Traffic Module 32 and the Outgoing Traffic Module 31 receive and send information respectively from and to the RCA 4, and the IVRA 3.

When Voting User 2 wants to become a registered active user of RCA 4, it will contact RCA 4 directly and send the request via the Outgoing Traffic Module 31. RCA 4 will generate an ID for this user, and send back to Voting User 2 via Incoming Traffic Module 32 his/her ID for the Secure Voting System, and a set of instruction of where to download the Standalone Protected Rhythm Software 9 to capture his/her typing rhythm, and operating manual of such software.

When IVRA 3 communicates via Incoming Traffic 26 with Voting User 2 sending Voting User 2 a text for typing and collecting the rhythm of typing of such text. Voting User 2 sends back the answer with the data of the collected typing rhythm to IVRA 3 via Outgoing Traffic Module 31.

In all cases after Incoming Traffic 26 is processed, Threat Detection Module 29 is called, and the Standalone Protected Rhythm Software 9 will perform a series of procedures to detect a threat (i.e. Leveraging Threat Intelligence, Analyzing User and Attacker Behavior Analytics, etc.) to the software.

If a threat is found, then the Threat Assessment Module 28 is called, else, the control is passed directly to the Rhythm Software Application 30. If the Threat Assessment Module 28 is called, then a determination of the credibility and seriousness of the detected threat as well as the probability that the threat will become a reality is done by this module.

Once all the threat assessments are done by the Threat Assessment Module 28, the Reaction Process module 27 is called. This module will generate the proper responses by the Standalone Protected Rhythm Software 9 to the detected threats. The responses can vary from a warning to the Voting User 2, to the delete of all rhythm data and Standalone Protected Rhythm Software from the Computer Device 7. In all cases the IVRA 3 will be notified of the threat detected and the reaction taken via the Outgoing Traffic Module 31.

Figure 6:
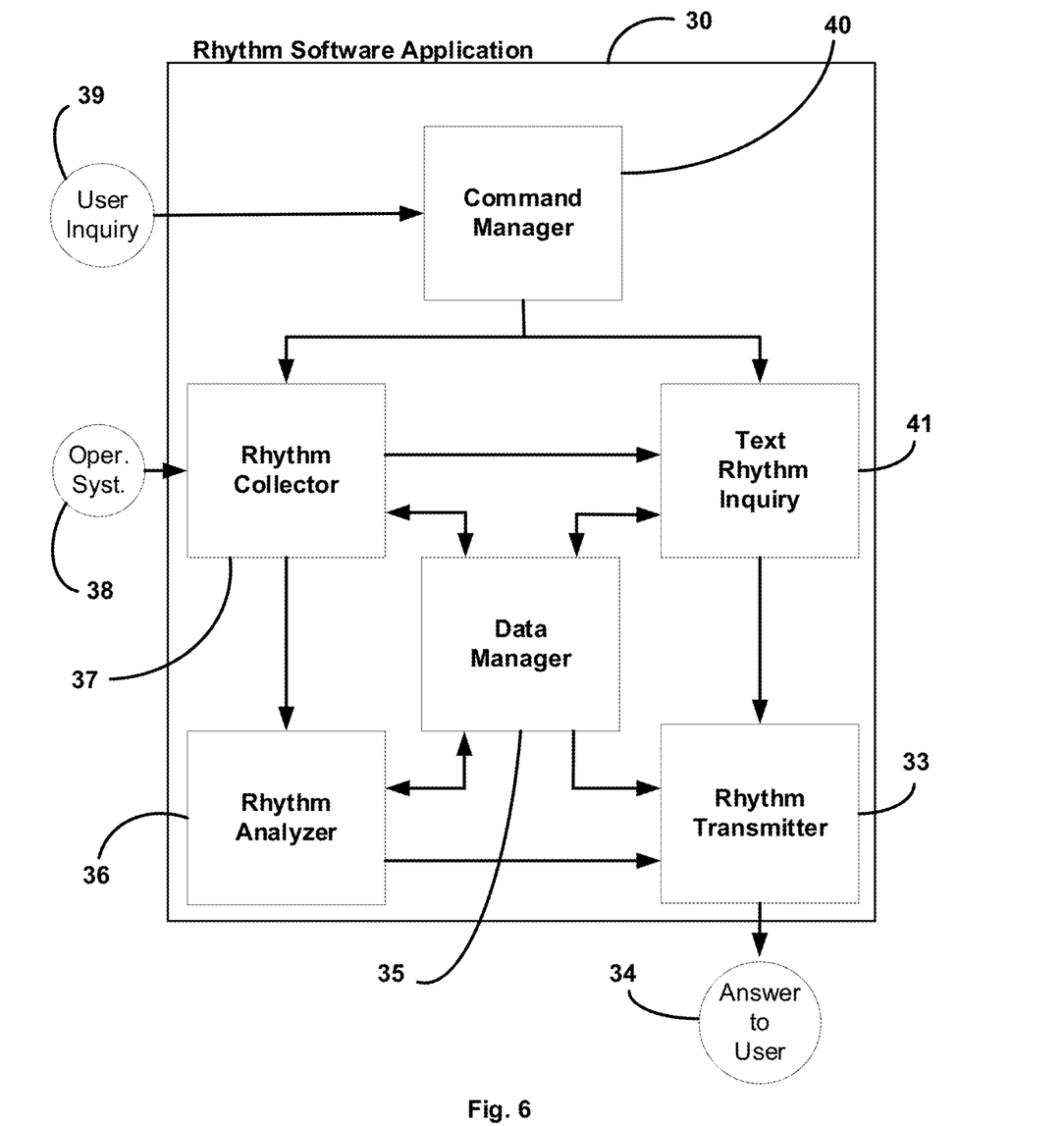
FIG. 6. is a high level system diagram of the basic functional decomposition of the Rhythm Software Application.

FIG. 6 is a block diagram illustrating the embodiment of a Rhythm Software Application 30. The Rhythm Software Application 30 runs locally on the user's computers and will collect, analyze and store the rhythm measurements of the user typing in the user's computer. There are two ways to call this software: when an event in the user's computer is related to the user's rhythm, the Operating System 38 will send the information of the event to the Rhythm Software Application 30, or when a user types a User Inquiry 60, which is a user command.

This Rhythm Software Application 30 is composed of six software modules. The first module the Rhythm Collector 37 receives from the Operating System 38 data of the user's typing rhythm on the local computer. The second module the Rhythm Analyzer 36 analyzes the measurements, saves the collected data and determines when the steady state of the measurements (i.e. the measurement does not change significantly the historical values of minimum and maximum values) has been achieved. To do this determination, several algorithms can be used. One of them is to check first if a high percentage of the different types (e.g. time pressing a key for each key, or time between X most used two letter words, etc.) of rhythm measurements have been used, and the amount of time elapsed since the last update to any of the data ranges of minimum and maximum values. The third module of the Rhythm Software Application 30 is the Rhythm Transmitter 33, which is the one who retrieves the stored user's information and prepares it in the proper format to be transmitted to the user 34. The fourth module is the Text Rhythm Inquiry 41 and is called by the when the user requests: a request to type a given text and return the user's rhythm of such typing, a request to transfer the complete user's rhythm information currently in local storage, or an end to capture the rhythm for the given text. The fifth module is the Command Manager 31, which receives commands directly form the user 39, decodes the command and calls the appropriate module to handle the requested command. The sixth module is the Data Manager module 35, which stores and retrieves data for the whole software application.

The first command the user will give the rhythm software application is a start command, which will initialize the Rhythm Collector 37, the Rhythm Analyzer 36 and the Data Manager 35 modules. With this command, the rhythm software application will start running in the background of the Operating System, and will not be called until either the user gives a new command 39, or the Operating System 38 sends a typing rhythm data.

When a user 39 sends a command to start the typing rhythm collection of a text, the Command Manager 40 calls the Text Rhythm Inquiry 41, this module will contact the Data Manager 35 to set a flag indicating that future typing from the user will be collected separately. The Text Rhythm Inquiry 41 then calls the Rhythm Transmitter 33 to answer the user 34 that the command was received and started.

From here on until and end of capture text rhythm is given by the user 39 the Rhythm Collector 37 when called, first will go an check if there is a text flag set (by inquiring the Data Manager 35), if this is not the case, it will continue normally by calling the Rhythm Analyzer 36 to continue with the normal typing rhythm of the user, but if the text flag was set, then the Rhythm Analyzer 36 will receive an indication that a special data collection is taking place (the one for the given text), and it will collect, store (using the Data Manager 35) and analyze the data for the specific typing text by the user.

When an end of capture text rhythm command is given by the user 39, the Command Manager 40 passes the information to the Text Rhythm Inquiry 41 module, which will retrieve form the Data Manger 35 the current typing rhythm for the given text provided previously, and sends this information to the Rhythm Transmitter 33 to answer the user 34 with the user's typing rhythm of the given text.

If the User Inquiry 39 is a command to download the current user's rhythm information, then the Command Manager 40, notifies the Text Rhythm Inquiry 41 module, which will retrieve form the Data Manger 35 the steady state user's current typing rhythm.

If the steady state has not been reached, the software application will notify the user 34 of this via the Rhythm Transmitter 33. If the steady state has been reached, the Rhythm Transmitter 33 prepares in the proper format the answer to the user 34 request to download the current user's rhythm information.

Figure 7:
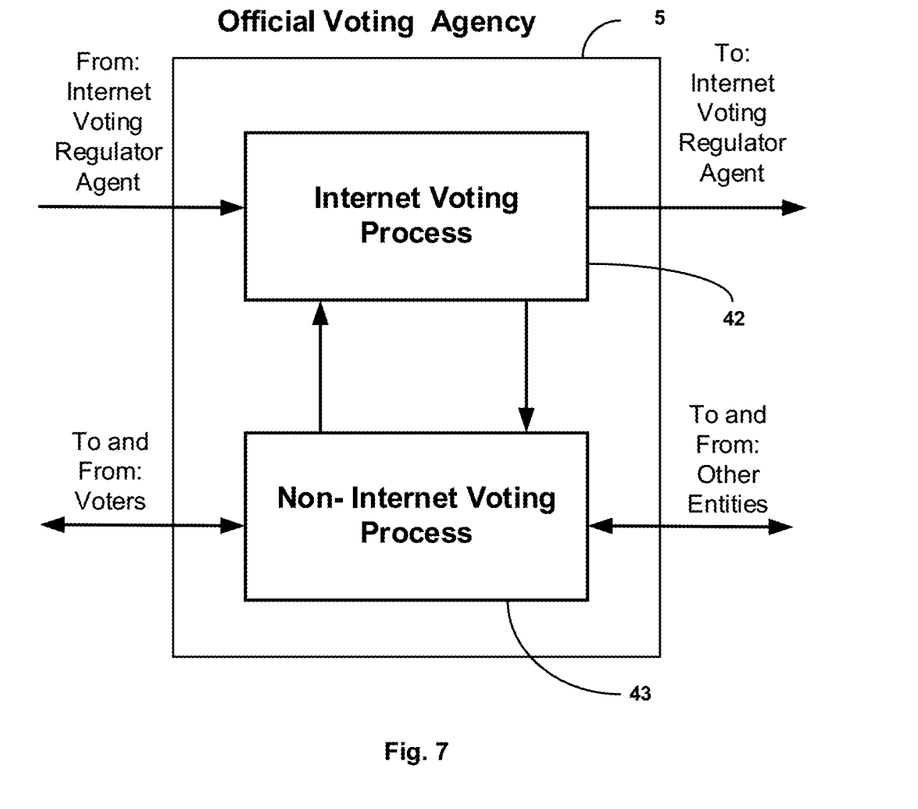
FIG. 7. is a high level system diagram of the basic functional decomposition of the Official Voting Agency

FIG. 7 shows a high level system diagram of the basic functional decomposition of the Official Voting Agency 5. The Official Voting Agency 5 is comprised of: an Internet Voting Process Module 42, and a Non-Internet Voting Process 43.

For effects of internet voting The OVA 5 will only communicate with the Internet Voting Regulator Agent 3 via the Internet Voting Process Module 42. The communication will be to validate the information of VU 2, and to send IVAR 3 the voting format for the approved IVU. It will receive from IVAR 3, any notification of processing error from IVU, and also the final voting results from a successful vote from VU 2.

OVA 5 communicates also with users externally (without using the internet voting platform) via the Non-Internet Voting Process 43 (visiting personally, by phone, mail, etc.). This Non-Internet Voting Process 41 is used to communicate with any other entity.

The Internet Voting Process Module 42, and the Non-Internet Voting Process 43 communicate directly inside the OVA 5.

The disclosure of the invention described herein-above represents the preferred embodiment of the invention; however, variations thereof, in the form, construction, and arrangement of the component thereof and the modified application of the invention are possible without departing from the spirit and scope of the appended claim.

I claim:

1. A computer-based method for secure voting over the internet by physical users voting, said method comprising:
   receiving, by an Internet Voting Regulator Agency a request from an internet user to become an internet voting user;
   validating, by the Internet Voting Regulator Agency, the internet user requesting to become the internet voting user;
   requesting, by the Internet Voting Regulator Agency, the internet voting user to generate a typing rhythm of given text included in said request;
   receiving, by an independent third party rhythm certification agency and from either said Internet Voting Regulator Agency or said voting user or said internet voting user, a request to validate and authenticate the typing rhythm of the internet voting user, and performing such validation and authentication of said typing rhythm of the internet voting user;
   receiving, by the internet voting user, from independent third-party rhythm certification agency computer, a proper voting form, instructions to vote, and text to authenticate;
   executing, by a computer of the internet voting user, a standalone protected rhythm software;
   capturing, by the computer of the internet voting user, the internet user typing rhythm of said given text and sending said captured internet user typing rhythm and filled voting form to the Internet Voting Regulator Agency;
   sending, by the standalone protected rhythm software, a typing rhythm validation request to the independent third-party rhythm certification agency computer;
   executing, by the independent third-party rhythm certification agency computer, an algorithm or procedure of said standalone protected rhythm software stored and implemented for security in the independent third-party rhythm certification agency computer;
   receiving, by the standalone protected rhythm software, an authentication results of the internet user typing rhythm;
   receiving and validating, by the Internet Voting Regulator Agency, the voting form from the internet voting user;
   receiving, by the official voting agency and from said Internet Voting Regulator Agency, the voting form sent by said internet voting user; and
   recording, by said official voting agency, the voting by said internet voting user;
   wherein the authenticating of the typing rhythm of the internet voting user by the independent third-party rhythm certification agency computer comprises:
      receiving, by the independent third party rhythm certification agency, an inquire from the internet user;
      receiving, by the independent third-party rhythm certification agency computer, a verification inquiry for the internet user being registered as the internet voting user;
      analyzing, by the independent third-party rhythm certification agency computer, a network security to detect attacks and threats to the independent third-party rhythm certification agency computer;
      generating, by the independent third-party rhythm certification agency computer, ID for the internet voting user;
      saving, by the independent third-party rhythm certification agency computer, the IDs in a Data Base;
      returning, by the independent third-party rhythm certification agency computer, the ID to the internet voting user and to the official voting agency;
      receiving, by the independent third party rhythm certification agency computer, a steady-state accumulated rhythm data from the internet voting user;
      saving, by the independent third-party rhythm certification agency computer, the steady-state accumulated rhythm data from the internet voting user in the Data Base;
      receiving, by the independent third-party rhythm certification agency computer and from the internet voting user, the typing rhythm of the text provided for authentication;
      validating and authenticating, by the independent third-party rhythm certification agency computer, the internet voting user's typing rhythm by comparing the received internet voting user's typing rhythm of the text provided for authentication with the rhythm data stored for internet voting user in the Data Base;

sending, by the independent third-party rhythm certification agency computer and to the internet user, internet user, instructions on how to become a registered internet voting user;

sending, by the independent third-party rhythm certification agency computer and to the Internet Voting Regulator Agency, a result of verification inquiry for the internet user being registered as an internet voting user;

sending, by the independent third-party rhythm certification agency computer and to the Internet Voting Regulator Agency, the result of validating and authenticating the internet voting user's typing rhythm;

receiving, by the independent third-party rhythm certification agency computer and from the computer of the internet voting user executing said standalone protected rhythm software, a request to execute remotely by the independent third-party rhythm certification agency an algorithm or procedure of said standalone protected rhythm software stored and implemented for security in the independent third-party rhythm certification agency;

sending, by the independent third-party rhythm certification agency computer, to said standalone protected rhythm software of internet voting user the results back of requested remote execution of procedures and algorithms of said standalone protected rhythm software;

wherein the independent third-party rhythm certification agency computer prevents attacks and threats against the independent third-party rhythm certification agency by performing the steps of:

guaranteeing, using access control, that said voting users are who they say they are, and that they have the appropriate access to said independent third-party rhythm certification agency data;

preventing, detecting, and removing malware using Antivirus software;

providing, using authentication, an assertion for the identity of said voting user;

granting access, using multi-factor authentication, only after successfully presenting said voting user ID and a valid rhythm data of said voting user;

verifying, using authorization, a right of access of said voting user;

converting, using encryption, information into secret code;

monitoring and controlling, using a firewall, incoming and outgoing network traffic based on predetermined security rules;

monitoring network traffic, using an intrusion detection system, for suspicious activity and issuing alerts when such activity is discovered; and mitigating, using denial of service protection, denial of service attacks;

wherein said standalone protected rhythm software for capturing voting user typing rhythm performs the steps of:

receiving, by the internet voting user, voting user instruction to start capturing the voting user typing rhythm data;

receiving, by the internet voting user and from a computer Operating System of the voting user, data of the typing rhythm;

receiving, by the internet voting user, voting user instruction to send the voting user typing rhythm data to the independent third-party rhythm certification agency;

sending, by the internet voting user, the internet voting user typing rhythm data to the independent third-party rhythm certification agency;

sending, by the internet voting user, the internet voting user's typing rhythm of authentication text to the official voting agency;

wherein the standalone protected rhythm software is running on the internet voting user's computer detecting threats to itself;

wherein the standalone protected rhythm software running on the internet voting user's computer assesses the credibility and seriousness of a detected threat as well as the probability that detected threat will become a reality;

wherein the standalone protected rhythm software running on the internet voting user's computer reacts with proper responses to the detected threats;

notifying, by the internet voting user, the official voting agency of the threats detected and the reactions taken by said standalone protected rhythm software;

requesting, by the standalone protected rhythm software running on the internet voting user's computer, to execute remotely by said Independent third-party rhythm certification agency an algorithm or procedure of said standalone protected rhythm software stored and implemented for security in said Independent third-party rhythm certification agency; and receiving, by the standalone rhythm software running on the internet voting user's computer, the results back of the requested remote execution of procedures and algorithms of said standalone protected rhythm software by said Independent third-party rhythm certification agency;

wherein detecting threats to said standalone protected rhythm software includes at least:

leveraging threat intelligence;

detecting spoofing of user identity;

detecting tampering of data and parameters;

detecting repudiation;

detecting information disclosure for data and data protection;

detecting denial of service attacks; and detecting elevation of privilege to obtain unauthorized access;

wherein said independent third-party rhythm certification agency further performs the steps of:

receiving a request from said standalone protected rhythm software to execute procedures stored locally at the independent third-party rhythm certification agency;

receiving a request from said standalone protected rhythm software to execute algorithms stored locally at the independent third-party rhythm certification agency;

receiving a request from said standalone protected rhythm software to access data stored locally at the independent third-party rhythm certification agency;

executing and sending back results of said standalone protected rhythm software requests; and accessing and sending back data results of said stand-alone protected rhythm software requests.

\* \* \* \* \*